(12) United States Patent
Kikuma

(10) Patent No.: US 10,630,400 B2
(45) Date of Patent: *Apr. 21, 2020

(54) DISPLAY DEVICE, IMAGE GENERATION DEVICE, COMMUNICATION DEVICE, COMMUNICATION SYSTEM, ANTENNA ADJUSTMENT METHOD, IMAGE GENERATION METHOD, AND NON-TRANSITORY COMPUTER READABLE MEDIUM STORING PROGRAM

(71) Applicant: NEC CORPORATION, Tokyo (JP)

(72) Inventor: Tomohiro Kikuma, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,142

(22) Filed: Jun. 28, 2019

(65) Prior Publication Data

US 2019/0319721 A1    Oct. 17, 2019

Related U.S. Application Data

(63) Continuation of application No. 16/124,250, filed on Sep. 7, 2018, now Pat. No. 10,382,149, which is a
(Continued)

(30) Foreign Application Priority Data

Feb. 27, 2015    (JP) .................................. 2015-038199

(51) Int. Cl.
*H04B 17/23*    (2015.01)
*H01Q 1/12*    (2006.01)
(Continued)

(52) U.S. Cl.
CPC ............... *H04B 17/23* (2015.01); *H01Q 1/12* (2013.01); *H01Q 3/08* (2013.01); *H04B 17/27* (2015.01); *H04B 17/309* (2015.01)

(58) Field of Classification Search
CPC combination set(s) only.
See application file for complete search history.

(56) References Cited

U.S. PATENT DOCUMENTS 5,313,215 A     5/1994  Walker et al.
6,300,905 B1   10/2001  Chen et al.
(Continued)

FOREIGN PATENT DOCUMENTS

JP    2006-086753 A    3/2006
JP    2007-198936 A    8/2007
(Continued)

OTHER PUBLICATIONS

Communication dated Dec. 7, 2017 from the European Patent Office in counterpart Application No. 16754877.5.
(Continued)

*Primary Examiner* — Junpeng Chen
(74) *Attorney, Agent, or Firm* — Sughrue Mion, PLLC

(57)    ABSTRACT

Provided is a display device that enables easy adjustment of an antenna in the most appropriate direction. An antenna angle acquisition unit (12) acquires antenna angle information indicating an antenna angle which is a horizontal angle and a vertical angle of an antenna (20) for receiving a signal from a radio wave generation source. A reception quality acquisition unit (14) acquires reception quality information indicating a quality of a received signal received by the antenna (20) at the antenna angle acquired by the antenna angle acquisition unit (12). A display unit (16) displays an antenna adjustment image where the antenna angle information and the reception quality information are associated
(Continued)

with each other based on the acquired antenna angle information and the acquired reception quality information.

8 Claims, 13 Drawing Sheets

Related U.S. Application Data continuation of application No. 15/550,470, filed as application No. PCT/JP2016/000033 on Jan. 6, 2016, now Pat. No. 10,103,827.

(51) Int. Cl.
*H01Q 3/08* (2006.01)
*H04B 17/27* (2015.01)
*H04B 17/309* (2015.01)

(56) References Cited

U.S. PATENT DOCUMENTS

| 2001/0022557 A1 | 9/2001 | Rouphael et al. |
| 2010/0280340 A1 | 11/2010 | Homan et al. |
| 2014/0152505 A1 | 6/2014 | Kim et al. |
| 2015/0171977 A1 | 6/2015 | Kashiwagi |
| 2015/0263408 A1 | 9/2015 | Hirabe |
| 2017/0179566 A1 | 6/2017 | Hirabe |

FOREIGN PATENT DOCUMENTS

| JP | 2010-0136282 A | 6/2010 |
| JP | 2010-200146 A | 9/2010 |
| JP | 2011-151722 A | 8/2011 |
| JP | 2014-230021 A | 12/2014 |

OTHER PUBLICATIONS

International Search Report for PCT/JP2016/000033, dated Feb. 9, 2016.

| COLOR | RECEPTION QUALITY VALUE |
|---|---|
| RED | $Q_a \leq Q$ |
| ORANGE | $Q_b \leq Q < Q_a$ |
| YELLOW | $Q_c \leq Q < Q_b$ |
| BLUE | $Q < Q_c$ |

Fig. 6

| COLOR | RECEPTION QUALITY VALUE |
|---|---|
| BRIGHT RED | $Qi \leq Q \leq Qmax$ |
| RED | $Qj \leq Q < Qi$ |
| ORANGE | $Qk \leq Q < Qj$ |
| YELLOW | $Ql \leq Q < Qk$ |
| YELLOW-GREEN | $Qm \leq Q < Ql$ |
| GREEN | $Qn \leq Q < Qm$ |
| BLUE | $Q < Qn$ |

Fig. 11

DISPLAY DEVICE, IMAGE GENERATION DEVICE, COMMUNICATION DEVICE, COMMUNICATION SYSTEM, ANTENNA ADJUSTMENT METHOD, IMAGE GENERATION METHOD, AND NON-TRANSITORY COMPUTER READABLE MEDIUM STORING PROGRAM

CROSS REFERENCE TO RELATED APPLICATIONS

This application is a Continuation of U.S. application Ser. No. 16/124,250, filed Sep. 7, 2018, which is a is a Continuation of U.S. application Ser. No. 15/550,470, filed. Aug. 11, 2017, now U.S. Pat. No. 10,103,827, patented on Oct. 16, 2018, which is a National Stage of International Application No. PCT/JP 2016/000033 filed Jan. 6, 2016, claiming priority based on Japanese Patent Application No. 2015-038199 filed Feb. 27, 2015, the contents of all of which are incorporated herein by reference.

TECHNICAL FIELD

The present invention relates to a display device, an image generation device, a communication device, a communication system, an antenna adjustment method, an image generation method, and a program.

BACKGROUND ART

Regarding an antenna of a wireless communication device or the like that receives radio waves from another wireless communication device, when the communication device receives radio waves from a radio wave generation source such as an opposite station, it is necessary to adjust the direction of the antenna in order to maximize the reception quality. For example, to adjust the direction of the antenna, an operator first visually makes a coarse adjustment by hand so that the front face of the antenna points to the radio wave generation source. Then, a fine adjustment of the antenna direction is made by hand to the angle at which the maximum reception revel output is obtained by using a reception level monitor such as a voltmeter. However, in the case of adjusting the direction of an antenna by hand as described above, an installation error is likely to occur, and it takes a long time to adjust the antenna in the most appropriate direction.

In relation to the above technique, Patent Literature 1 discloses a receiving device that allows a user to more easily adjust the antenna direction or the like. The receiving device disclosed in Patent Literature 1 detects information about the reception condition such as the received signal level of a received digital signal, detects the direction of an antenna that has received the digital signal, and stores information about the direction of the antenna that has received the digital signal and information about the reception condition in each direction in association with each other. Then, the receiving device detects the most appropriate direction of the antenna based on the stored information and generates display information to display information containing the most appropriate direction.

CITATION LIST

Patent Literature

PTL1: Japanese Unexamined Patent Application Publication No 2006-86753.

SUMMARY OF INVENTION

Technical Problem in the above-described Patent Literature 1, a one-dimensional direction in the horizontal direction and the reception quality are merely displayed in association with each other. In the adjustment of the antenna direction, it is required to adjust the antenna not only in the horizontal direction but also in the vertical direction. However, because only a one-dimensional direction in the horizontal direction is shown in the above-described Patent Literature 1, it is difficult to adjust the antenna both in the horizontal direction and in the vertical direction. Therefore, it takes a long time to adjust the antenna in the most appropriate direction.

An exemplary object of the present invention is to solve such a problem and provide a display device, an image generation device, a communication device, a communication system, an antenna adjustment method, an image generation method, and a program that enable easy adjustment of an antenna in the most appropriate direction.

Solution to Problem

A display device according to an exemplary aspect of the present invention includes an antenna angle acquisition means for acquiring antenna angle information indicating an antenna angle which is a horizontal angle and a vertical angle of an antenna for receiving a signal from a radio wave generation source; a reception quality acquisition means for acquiring reception quality information indicating a quality of a received signal received by the antenna at the antenna angle acquired by the antenna angle acquisition means; and a display means for displaying an antenna adjustment image where the antenna angle information and the reception quality information are associated with each other based on the acquired antenna angle information and the acquired reception quality information, wherein the antenna adjustment image is formed so that the reception quality information corresponding to each antenna angle is plotted in a two-dimensional coordinate system composed of the horizontal angle and the vertical angle, and, in the antenna adjustment image, the reception quality information is plotted so that the reception quality information indicating the same quality is in visually the same image representation.

A communication system according to an exemplary aspect of the present invention includes an antenna for receiving a signal from a radio wave generation source; a display device for displaying an image; an antenna angle detection means for detecting an antenna angle which is a horizontal angle and a vertical angle of the antenna and outputting antenna angle information indicating the detected antenna angle to the display device; and a reception quality measurement means for measuring a quality of a received signal received by the antenna at the antenna angle detected by the antenna angle detection means and outputting reception quality information indicating the measured quality to the display device, wherein the display device displays an antenna adjustment image where the antenna angle information and the reception quality information are associated with each other based on the output antenna angle information and the output reception quality information, the antenna adjustment image is formed so that the reception quality information corresponding to each antenna angle is plotted in a two-dimensional coordinate system composed of the horizontal angle and the vertical angle, and, in the antenna adjustment image, the reception quality information is plotted so that the reception quality information indicating the same quality is in visually the same image representation.

An antenna adjustment method according to an exemplary aspect of the present invention includes acquiring antenna angle information indicating an antenna angle which is a horizontal angle and a vertical angle of an antenna for receiving a signal from a radio wave generation source; acquiring reception quality information indicating a quality of a received signal received by the antenna at the acquired antenna angle; displaying an antenna adjustment image based on the acquired antenna angle information and the acquired reception quality information, where the antenna adjustment image is formed so that the reception quality information corresponding to each antenna angle is plotted in a two-dimensional coordinate system composed of the horizontal angle and the vertical angle, and the reception quality information is plotted in the antenna adjustment image so that the reception quality information indicating the same quality is in visually the same image representation; and adjusting the antenna angle of the antenna by using the displayed antenna adjustment image.

A program according to an exemplary aspect of the present invention causes a computer to execute a step of acquiring antenna angle information indicating an antenna angle which is a horizontal angle and a vertical angle of an antenna for receiving a signal from a radio wave generation source; a step of acquiring reception quality information indicating a quality of a received signal received by the antenna at the acquired antenna angle; and a step of displaying an antenna adjustment image based on the acquired antenna angle information and the acquired reception quality information, where the antenna adjustment image is formed so that the reception quality information corresponding to each antenna angle is plotted in a two-dimensional coordinate system composed of the horizontal angle and the vertical angle, and the reception quality information is plotted in the antenna adjustment image so that the reception quality information indicating the same quality is in visually the same image representation.

An image generation device according to an exemplary aspect of the present invention includes a first image generation means for generating a first image showing, in a two-dimensional coordinate system whose coordinate axes respectively correspond to angles of an antenna in a biaxial method, reception quality information indicating a quality of a received signal received by the antenna at each antenna angle being the angles of the antenna in the biaxial method; and a second image generation means for generating a second image showing the current antenna angle.

A communication device according to an exemplary aspect of the present invention includes an image generation device; a transmitting and receiving unit configured to transmit or receive a signal through the antenna; and an antenna angle acquisition means for detecting the antenna angle and acquiring antenna angle information indicating the detected antenna angle.

An image generation method according to an exemplary aspect of the present invention includes generating a first image showing, in a two-dimensional coordinate system whose coordinate axes respectively correspond to angles of an antenna in a biaxial method, reception quality information indicating a quality of a received signal received by the antenna at each antenna angle being the angles of the antenna in the biaxial method; and generating a second image showing the current antenna angle.

A communication device according to an exemplary aspect of the present invention outputs reception quality information to an image generation device including a first image generation means for generating a first image showing, in a two-dimensional coordinate system whose coordinate axes respectively correspond to angles of an antenna in a biaxial method, reception quality information indicating a quality of a received signal received by the antenna at each antenna angle being the angles of the antenna in the biaxial method, and a second image generation means for generating a second image showing the current antenna angle.

Advantageous Effects of Invention

According to the exemplary aspects of the present invention described above, it is possible to provide a display device, an image generation device, a communication device, a communication system, an antenna adjustment method, an image generation method, and a program that enable easy adjustment of an antenna in the most appropriate direction.

BRIEF DESCRIPTION OF DRAWINGS

FIG. 6 is a view showing an example of a color allocation table according to the first exemplary embodiment.

FIG. 11 is a view showing an example of a color allocation table according to the second exemplary embodiment.

DESCRIPTION OF EMBODIMENTS

Overview of Exemplary Embodiment

Figure 1:
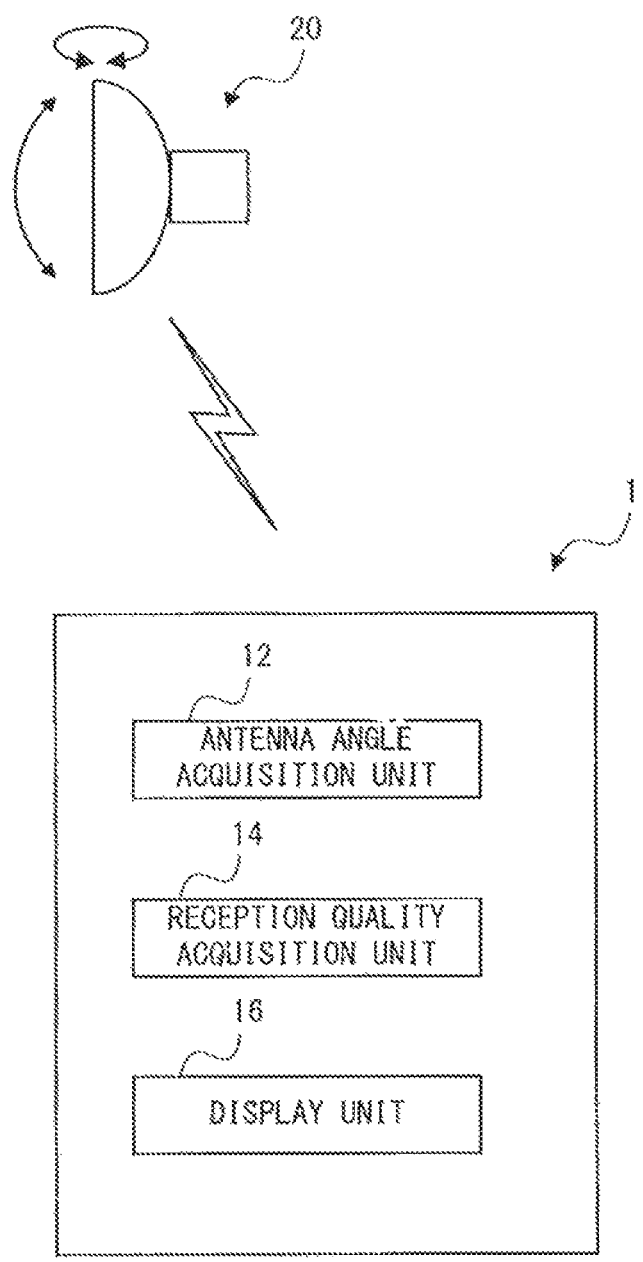
FIG. 1 is a view showing the overview of a display device according to an exemplary embodiment.

Prior to describing exemplary embodiments, an overview of an exemplary embodiment is given hereinafter with reference to FIG. 1. FIG. 1 is a view showing the overview of a display device 1 according to this exemplary embodiment.

A display device 1 includes an antenna angle acquisition unit (antenna angle acquisition means), a reception quality acquisition unit 14 (reception quality acquisition means and a display unit 16 (display manes). The antenna angle acquisition unit 12 acquires antenna angle information indicating an antenna angle, which is a horizontal angle and a vertical angle of an antenna 20 that receives a signal from a radio wave generation source. The reception quality acquisition unit 14 acquires reception quality information indicating the quality of a received signal received by the antenna 20 at the antenna angle acquired by the antenna angle acquisition unit 12.

The display unit 16 displays an antenna adjustment image in which the antenna angle information and the reception quality information are associated with each other based on the acquired antenna angle information and reception quality information. The antenna adjustment image is formed so that the reception quality information corresponding to each antenna angle is plotted in a two-dimensional coordinate system composed of a horizontal angle and a vertical angle. Specifically, coordinate axes of the two-dimensional coordinate system in the antenna adjustment image respectively correspond to the angles of the antenna 110 in the biaxial method. Note that, although the angles in the biaxial method are a horizontal angle and a vertical angle of the antenna 110, for example, they are not limited thereto. Specifically, the "angles in the biaxial method" are not limited to angles in the directions orthogonal to each other. Further, the reception quality information is plotted in the antenna adjustment image so that the reception quality information indicating the same quality is in visually the same image representation.

Since the display device 1 according to this exemplary embodiment displays the above-described antenna adjustment image, it enables easy adjustment of an antenna in the most appropriate direction. Note that, a communication system that includes the display device 1 and the antenna 20, an antenna adjustment method using the display device 1, and a program incorporated into the display device 1 also enable easy adjustment of an antenna in the most appropriate direction.

First Exemplary Embodiment

Exemplary embodiments of the present invention are described hereinafter with reference to the drawings.

Figure 2:
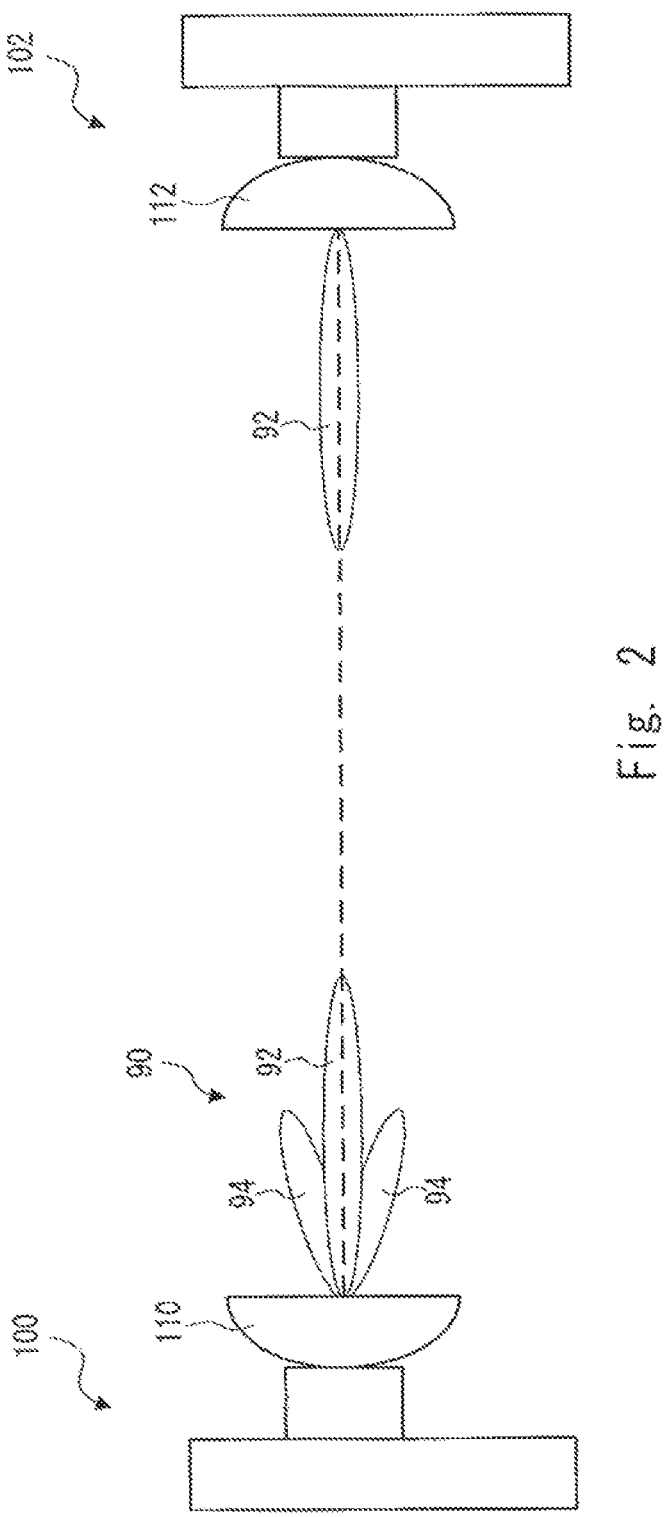
FIG. 2 is a view to describe adjustment of an antenna angle between a wireless communication device and the opposite station according to a first exemplary embodiment.

FIG. 2 is a view showing adjustment of an antenna angle between a wireless communication device 100 and the opposite station 102 according to the first exemplary embodiment.

An antenna pattern 90 of an antenna 110 of the wireless communication device 100 consists of a main lobe 92 where the quality of a received signal (or a transmission signal) is highest and a side lobe 94 where the quality thereof is lower than that of the main lobe 92. In the adjustment of an antenna angle, the direction of the antenna 110 of the wireless communication device 100 is adjusted so that the main lobe 92 in the antenna 110 of the wireless communication device 100 is aligned with another main lobe 92 in an antenna 112 of the opposite station 102. At this time, when the wireless communication device 100 is the receiving end and the opposite station 102 is the transmitting end, the antenna angle at which the reception quality in the wireless communication device 100 is highest is the most appropriate direction of the antenna 110. The "antenna direction" corresponds to a horizontal angle (azimuth) and a vertical angle (elevation) of the antenna 110.

Figure 3:
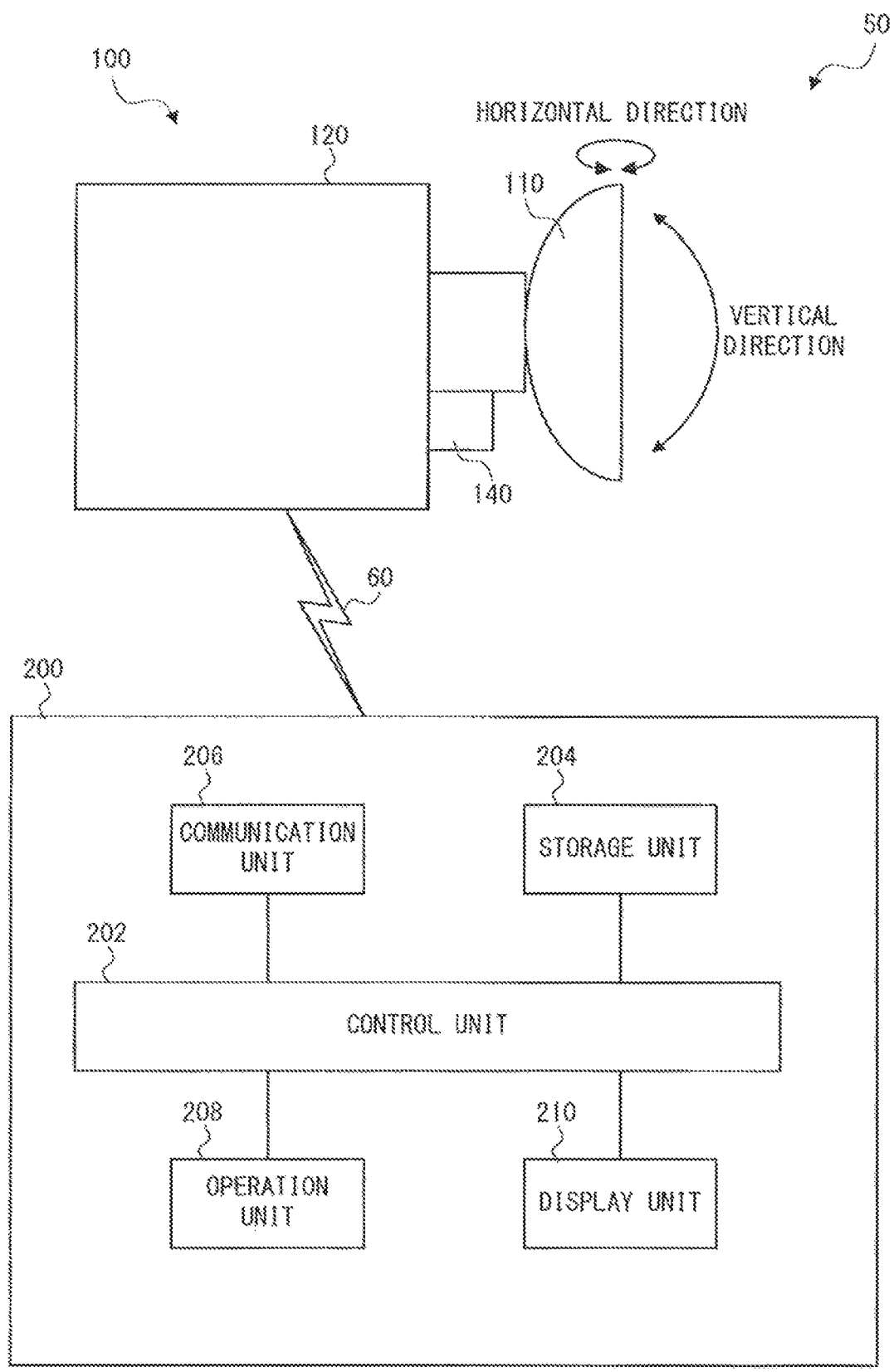
FIG. 3 is a view showing a hardware configuration of a communication system according to the first exemplary embodiment.

FIG. 3 is a view showing a hardware configuration of a communication system 50 according to the first exemplary embodiment. The communication system 50 includes the wireless communication device 100 and a display device 200. The display device 200 is connected with the wireless communication device 100 in such a manner that they can communicate through a communication channel 60. The communication channel 60 may be a wired connection such as a cable or a wireless connection such as WiFi or Bluetooth (registered trademark). Further, there may be a plurality of communication channels 60, and a combination of wired and wireless connections may be used.

The wireless communication device 100 includes an antenna. 110 that receives radio signals from a radio wave generation source such as the opposite station 102 (another wireless communication device), a communication instrument 120, and an antenna angle detection unit 140 (antenna angle detection means) that detects the angle of the antenna 110. The communication instrument 120 is described later. The direction of the antenna 110 can be adjusted in the horizontal direction and in the vertical direction by, for example, hand. Note that the direction (antenna angle) of the antenna 110 may be adjusted by a mechanical structure such as a motor or the like, instead of it being adjusted by hand.

The antenna angle detection unit 140 detects the horizontal angle and the vertical angle of the antenna 110. The antenna angle detection unit 140 includes, for example, a gyro sensor or the like, though it is not limited thereto. Further, the antenna angle detection unit 140 is preferably installed externally near the antenna 110. Note, however, that the antenna angle detection unit 140 may be installed inside the wireless communication device 100.

The display device 200 displays some image in a way visible to a user. The display device 200 is, for example, a computer. The display device 200 is, for example, an information processing device such as a tablet terminal or a smartphone, though it is not limited thereto. The display device 200 includes a control unit 202 such as a CPU (Central Processing Unit), a storage unit 204 such as a memory or a hard disk, a communication unit 206, an operation unit 208, and a display unit 210. The control unit 202 controls the storage unit 204, the communication unit 206, the operation unit 208, and the display unit 210.

The communication unit 206 performs processing that is necessary for communications with the wireless communication device 100 connected through the communication channel 60. The operation unit 208 is, for example, a touch panel, an LCD (Liquid Crystal Display), a keyboard or the like. The display unit 210 is, for example, a touch panel, an LCD or the like. The operation unit 208 and the display unit 210 may be integrated as a touch panel. The operation unit 208 receives a user operation by control of the control unit 202. The display unit 210 displays information that is required for a user, such as an image, by control of the control unit 202.

Figure 4:
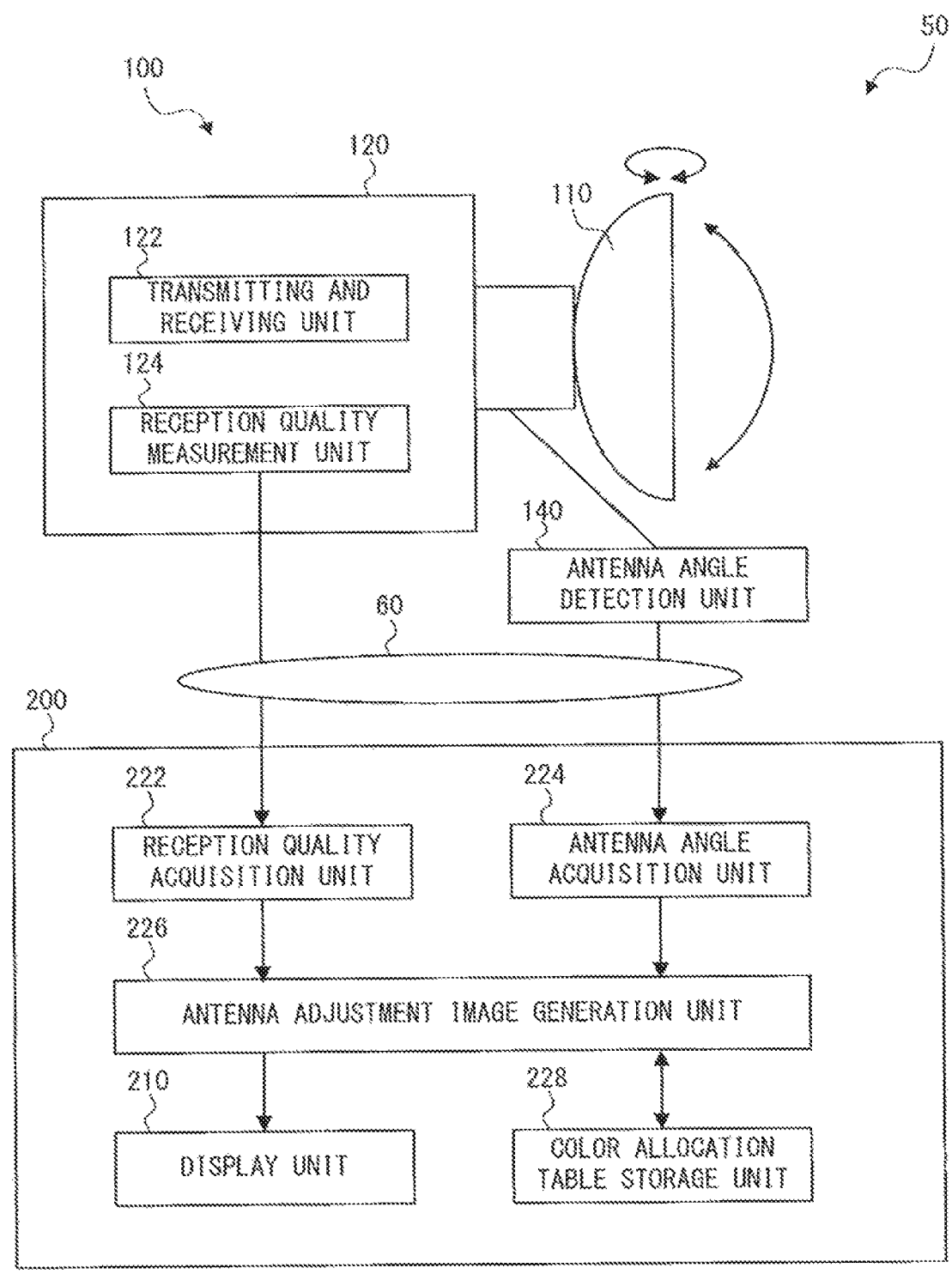
FIG. 4 is a functional block diagram of the communication system according to the first exemplary embodiment.

FIG. 4 is a functional block diagram of the communication system 50 according to the first exemplary embodiment. The communication instrument 120 includes a transmitting and receiving unit 122 and a reception quality measurement unit 124. The transmitting and receiving unit 122 receives a signal through the antenna 110, performs necessary processing such as demodulation, and thereby obtains user data. Further, the transmitting and receiving unit 122 performs necessary processing such as modulation on user data and transmits a signal through the antenna 110.

The reception quality measurement unit 124 (reception quality measurement means) measures the quality of a received signal received by the antenna 110. The reception quality measurement unit 124 then outputs reception quality information indicating the measured quality (quality value) of the received signal to the display device 200 through the communication channel 60. The function of the reception quality measurement unit 124 is not necessarily provided inside the communication instrument 120, and it may be provided outside the communication instrument 120.

Note that the "quality of a received signal" may be, for example, a Received Signal Level (RSL) or a Received Signal Strength Indication (RSSI). Further, the "quality of a received signal" may be, for example, a Signal to Noise Ratio (SNR), a Signal to Interference Noise Ratio (SINR) or a Carrier to Interference Noise Ratio (CINR). Furthermore, the "quality of a received signal" may be a combination of two or more of these ratios.

The antenna angle detection unit 140 detects the horizontal angle and the vertical angle of the antenna 110 as described above. Then, the antenna angle detection unit 140 outputs antenna angle information indicating the detected antenna angle (the horizontal angle and the vertical angle) to the display device 200 through the communication channel 60.

The display device 200 includes a reception quality acquisition unit 222, an antenna angle acquisition unit 224, an antenna adjustment image generation unit 226, a color allocation table storage unit 228, and a display unit 210. Note that the reception quality acquisition unit 222, the antenna angle acquisition unit 224, the antenna adjustment image generation unit 226, and the color allocation table storage unit 228 can be implemented using a program. To be specific, those elements can be implemented by executing a program stored in the storage unit 204 by control of the control unit 202. Further, those elements are not necessarily implemented by software as a program; instead, it can be implemented by a combination of any hardware, firmware and software or the like. The same applies to the other exemplary embodiments.

The reception quality acquisition unit 222 acquires the reception quality information output from the reception quality measurement unit 124 through the communication channel 60. The reception quality acquisition unit 222 then outputs the acquired reception quality information to the antenna adjustment image generation unit 226. The antenna angle acquisition unit 224 acquires the antenna angle information output from the antenna angle detection unit 140 through the communication channel 60. The antenna angle acquisition unit 224 then outputs the acquired antenna angle information to the antenna adjustment image generation unit 226.

The antenna adjustment image generation unit 226 generates an antenna adjustment image in which the antenna angle information and the reception quality information are associated with each other by using the reception quality information and the antenna angle information. The color allocation table storage unit 228 stores a color allocation table (which is described later with reference to FIG. 6) that is used when the antenna adjustment image generation unit 226 generates the antenna adjustment image. Then, the display unit 210 displays the generated antenna adjustment image.

The antenna adjustment image is formed with a two-dimensional coordinate system where the horizontal axis indicates a horizontal angle and the vertical axis indicates a vertical angle, as described later with reference to FIG. 7. The antenna adjustment image is formed so that the reception quality information corresponding to each antenna angle is plotted in the two-dimensional coordinate system. Further, the reception quality information is plotted in the antenna adjustment image so that the reception quality information indicating the same quality is in the same color representation. This is described in detail later.

Figure 5:
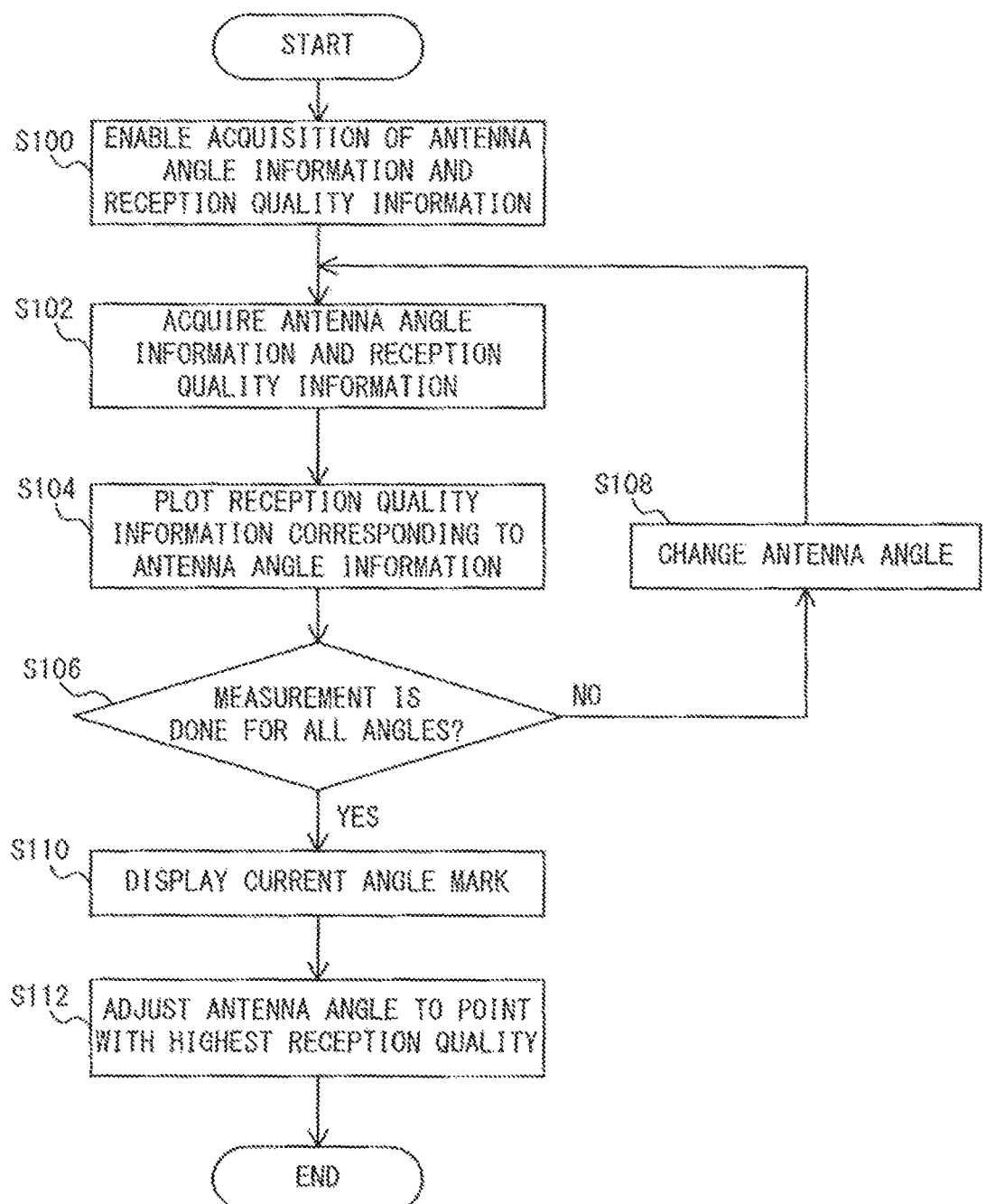
FIG. 5 is a flowchart showing an antenna adjustment method according to the first exemplary embodiment.

FIG. 5 is a flowchart showing an antenna adjustment method according to the first exemplary embodiment. First, the display device 200 is made to be able to acquire the antenna angle information and the reception quality information (Step S100). To be specific, a user (operator) connects the display device 200 and the wireless communication device 100 so that they can communicate through the communication channel 60. The display device 200 thereby becomes able to acquire the antenna angle information and the reception quality information.

Next, the display device 200 acquires the antenna angle information and the reception quality information (Step S102). To be specific, the reception quality acquisition unit 222 of the display device 200 acquires the reception quality information through the communication channel 60. Further, the antenna angle acquisition unit 224 acquires the antenna angle information through the communication channel 60.

Then, the display device 200 plots the reception quality information corresponding to the antenna angle information (Step S104). To be specific, in the first exemplary embodiment, the color allocation table storage unit 228 stores the color allocation table in advance as shown in FIG. 6. Then, the antenna adjustment image generation unit 226 plots the reception quality information at the positions corresponding to the antenna angle information in the two-dimensional coordinate system by using the color allocation table. The antenna adjustment image generation unit 226 thereby generates an antenna adjustment image. The display unit 210 then displays the antenna adjustment image generated by the antenna adjustment image generation unit 226.

FIG. 6 is a view showing an example of the color allocation table according to the first exemplary embodiment. In the example of FIG. 6, when a reception quality value Q indicated by the reception quality information is equal to or more than Qa, the antenna adjustment image generation unit 226 plots the position corresponding to the antenna angle information related to that reception quality information by red color. Further, when the reception quality value Q is equal to or more than Qb and less than Qa, the antenna adjustment image generation unit 226 plots the position corresponding to the antenna angle information related to that reception quality information by orange color. Further, when the reception quality value Q is equal to or more than Qc and less than Qb, the antenna adjustment image generation unit 226 plots the position corresponding to the antenna angle information related to that reception quality information by yellow color. Further, when the reception quality value Q is less than Qc, the antenna adjustment image generation unit 226 plots the position corresponding to the antenna angle information related to that reception quality information by blue color.

For example, when the antenna angle information indicates [horizontal angle, vertical angle]=[θh1, θv1] and the reception quality information indicates Q1 (Qa≤Q1), the antenna adjustment image generation unit 226 plots the position of [θh1, θv1] by red color. Further, for example, when the antenna angle information indicates [horizontal angle, vertical angle]=[θh2, θv2] and the reception quality information indicates Q2 (Qb≤Q2<Qa), the antenna adjustment image generation unit 226 plots the position of [θh2, θv2] by orange color. Likewise, for example, when the antenna angle information indicates [horizontal angle, vertical angle]=[θh3, θv3] and the reception quality information indicates Q3 (Qc≤Q3<Qb), the antenna adjustment image generation unit 226 plots the position of [θh3, θv3] by yellow color.

Note that, although the reception quality information is represented by four colors in the first exemplary embodiment, it is not limited thereto. The reception quality information may be represented by five or more colors. Further, in the first exemplary embodiment, the color allocation table can be set arbitrarily by a user or the like by some experimental rules and the like.

After that, the display device 200 determines whether the measurement of the quality of a received signal is done for all angles (Step S106). To be specific, the antenna adjustment image generation unit 226 determines whether the reception quality information has been obtained for all antenna angles in a predetermined range. The "predetermined range" may be, for example, a range where the horizontal angle is between −90° to +90° and the vertical angle is between −90° to +90°. Further, in the case where a relatively accurate adjustment is possible in a coarse adjustment, the "predetermined range" may be, for example, a range where the horizontal angle is between −20° to +20° and the vertical angle is between −20° to +20°.

When the measurement of the quality of a received signal is not done for all angles (No in Step S106), the antenna angle is changed (Step S108). To be specific, a user moves the antenna 110 and changes at least one of the horizontal angle and the vertical angle of the antenna 110. On the other hand, when the measurement of the quality of a received signal is done for all angles (Yes in Step S106), the display device 200 displays a current angle mark indicating the current antenna angle of the antenna 110 (Step S110). To be specific, when the measurement of the quality of a received signal is done for all angles, the generation of the antenna adjustment image is completed. Then, the antenna angle acquisition unit 224 acquires the antenna angle information indicating the current antenna angle from the antenna angle detection unit 140 and outputs it to the antenna adjustment image generation unit 226. The antenna adjustment image generation unit 226 displays the current angle mark at the position corresponding to the current antenna angle of the antenna 110 on the completed antenna adjustment image by using the current antenna angle information.

Then, the antenna angle is adjusted to the point with the highest reception quality by using the antenna adjustment image (Step S112). The antenna angle is thereby adjusted to the center of an antenna beam. To be specific, a user changes the antenna angle of the antenna 110, looking at the antenna adjustment image, and sets the current angle mark at the point at which the quality of a received signal is highest on the antenna adjustment image. At this time, each time the current antenna angle is changed, the antenna angle acquisition unit 224 acquires the antenna angle information. Then, each time the current antenna angle is changed, the antenna adjustment image generation unit 226 moves the position of the current angle mark on the antenna adjustment image.

At this time, a user may adjust the direction of the antenna 110 by hand, or the direction of the antenna 110 may be adjusted by using an electrical or mechanical structure. Further, the antenna 110 may be controlled automatically so that the antenna angle is set at the point with the highest reception quality.

Figure 7:
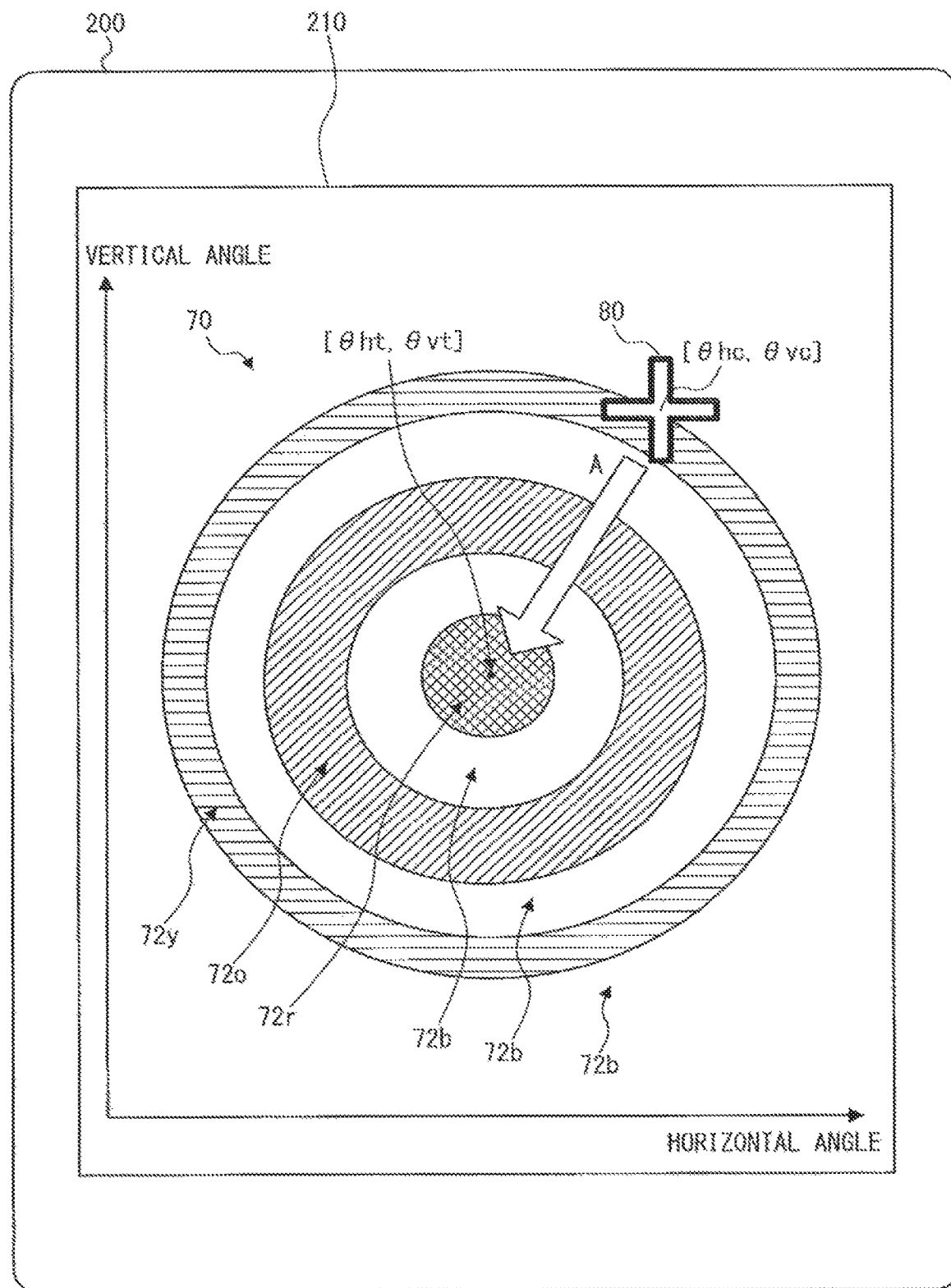
FIG. 7 is a view showing an example of an antenna adjustment image displayed on a display device according to the first exemplary embodiment.

FIG. 7 is a view showing an example of the antenna adjustment image displayed on the display device 200 according to the first exemplary embodiment. In FIG. 7, the display unit 210 displays an antenna adjustment image 70. In the antenna adjustment image 70, the horizontal direction (the horizontal axis in the two-dimensional coordinate system) indicates an angle in the horizontal direction (horizontal angle), and the vertical direction (the vertical axis in the two-dimensional coordinate system) indicates an angle in the vertical direction (vertical angle), Further, the display unit 210 displays a current angle mark 80 at the position corresponding to the current antenna angle [θhc, θvc]. Because the reception quality information indicating the same quality is shown using the same color representation in the antenna adjustment image 70, the antenna adjustment image 70 is formed like an isopleth diagram.

In the example of FIG. 7, in the antenna adjustment image 70, a region 72r located near the center is represented by red color. In the above example, the region 72r indicates the antenna angle corresponding to the reception quality information where the reception quality value is equal to or more than Qa. Further, in the antenna adjustment image 70, a region 72o located around the region 72r is represented by orange color. In the above example, the region 72o indicates the antenna angle corresponding to the reception quality information where the reception quality value is equal to or more than Qb and less than Qa. Further, in the antenna adjustment image 70, a region 72y located around the region 72o is represented by yellow color. In the above example, the region 72y indicates the antenna angle corresponding to the reception quality information where the reception quality value is equal to or more than Qc and less than Qb. Further, in the antenna adjustment image 70, a region 72b is represented by blue color. The region 72h is located between the region 72r and the region 72o, between the region 72o and the region 72y, and around the region 72y. In the above example, the region 72h indicates the antenna angle corresponding to the reception quality information where the reception quality value is less than Qc.

Further, in the above example, a point (the reception quality information: Q1) corresponding to the antenna angle [θh1, θv1] is included in the region 72r. Further, a point (the reception quality information: Q2) corresponding to the antenna angle [θh2, θv2] is included in the region 72o. Likewise, a point (the reception quality information: Q3) corresponding to the antenna angle [θh3, θv3] is included in the region 72y.

In FIG. 7, the quality of a received signal is highest at the position corresponding to the region 72r. Thus, the antenna angle corresponding to the region 72r can correspond to the main lobe 92. On the other hand, in the region 72o and the region 72y, the quality of a received signal is lower than that in the region 72r. Thus, the antenna angle corresponding to the region 72o and the region 72y can correspond to the side lobe 94. Accordingly, the point [θht, θvt] at the center of the region 72r in the antenna adjustment image 70 is estimated as the point at which the reception quality value is highest. Therefore, a user adjusts the antenna angle so as to set the current angle mark at the point [θht, θvt] as shown by the arrow A. A user can thereby easily adjust the antenna 110 in the most appropriate direction.

Comparative Example

Hereinafter, a contrast with a comparative example is described with reference to FIGS. 8 and 9.

Figure 8:
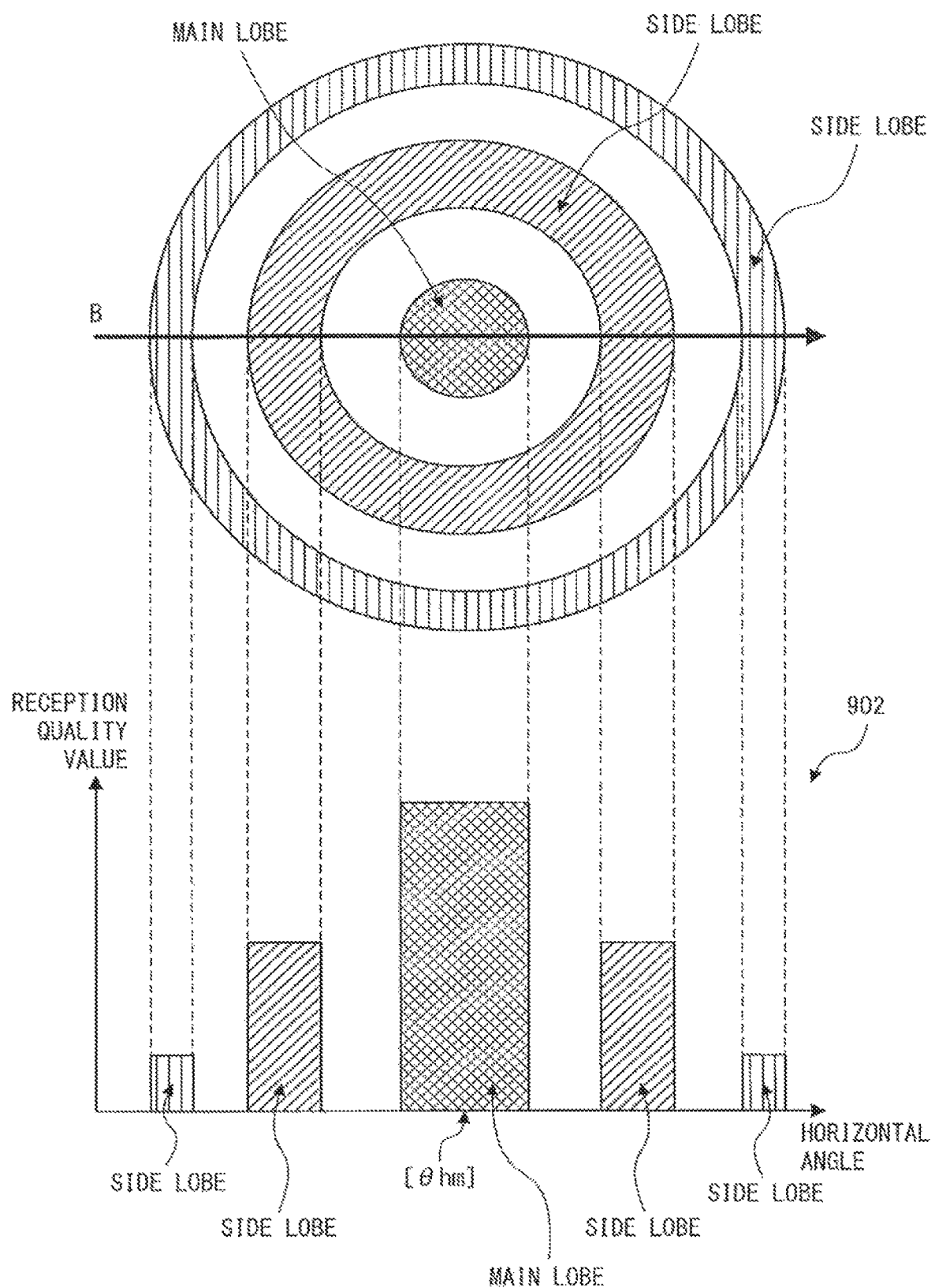
FIG. 8 is a view to describe a contrast between an exemplary embodiment and a comparative example.
Figure 9:
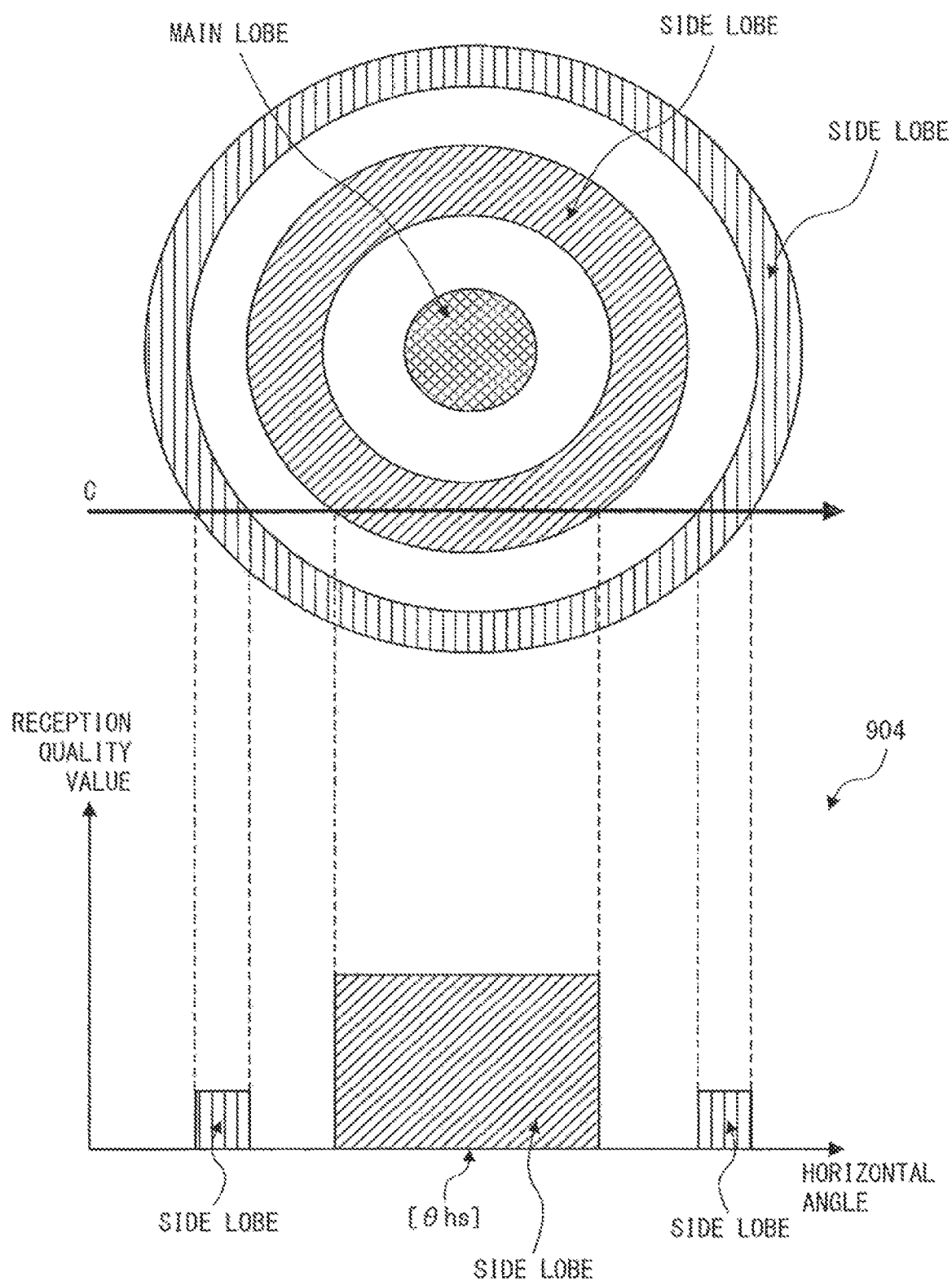
FIG. 9 is a view to describe a contrast between an exemplary embodiment and a comparative example.

FIGS. 8 and 9 are views to describe a contrast between this exemplary embodiment and a comparative example. In the comparative example, a display screen on which a reception quality value and only one of a horizontal angle and a vertical angle are associated is displayed. In FIGS. 8 and 9, a display screen on which a reception quality value and a horizontal angle are associated is displayed.

In FIG. 8, in the case where the vertical angle of the antenna 110 is at the vertical angle corresponding to the main lobe 92, if the reception quality value is measured changing the horizontal angle of the antenna 110 as shown by the arrow B, a display screen 902 is displayed. On the display screen 902, the reception quality value is highest at the angle corresponding to the main lobe 92. Thus, at this time, a user can set the horizontal angle of the antenna 110 at the horizontal angle [θhm] corresponding to the main lobe 92 by referring to the display screen 902.

On the other hand, in FIG. 9, in the case where the vertical angle of the antenna 110 is not at the vertical angle corresponding to the main lobe 92, if the reception quality value is measured changing the horizontal angle of the antenna 110 as shown by the arrow C, a display screen 904 is displayed. On the display screen 904, the reception quality value is highest at the angle corresponding to the side lobe 94. A user cannot recognize that the angle [θhs] corresponding to the side lobe 94 is not the most appropriate direction. Thus, by referring to the display screen 904, there is a possibility that a user determines that an adjustment in the most appropriate direction can be made by setting the horizontal angle of the antenna 110 at the horizontal angle [θhm] corresponding to the side lobe 94. Because it is difficult in the comparative example to adjust the horizontal direction and the vertical direction at the same time, it takes a long time to adjust the antenna in the most appropriate direction.

On the other hand, the antenna adjustment image 70 according to this exemplary embodiment is formed so that the reception quality information corresponding to each antenna angle is plotted in a two-dimensional coordinate system composed of a horizontal angle and a vertical angle. Further, the antenna adjustment image 70 is, for example, plotted so that the reception quality information indicating the same quality is represented by the same color, such as the regions 72r, 72o, 72y and 72b. A user can thereby easily grasp the antenna angle corresponding to the main lobe 92. Accordingly, a user can easily adjust the antenna in the most appropriate direction.

Further, the display unit 210 displays the current angle mark 80 so that it is superimposed on the antenna adjustment image 70. A user can thereby easily grasp a difference between the current antenna angle and the most appropriate direction. It is thereby possible to more easily adjust the antenna in the most appropriate direction. Further, by representing the quality value of the reception quality information by color, it is possible to allocate a color which a user feels the most intense (for example, red color) to the highest quality value. A user can thereby intuitively grasp at which antenna angle the reception quality value is highest (which direction is the most appropriate direction) in the antenna adjustment image 70.

Second Exemplary Embodiment

A second exemplary embodiment is described hereinbelow. In the second exemplary embodiment, the hardware configuration of the communication system 50 is the one shown in FIG. 3, which is the same as that in the first exemplary embodiment. On the other hand, in the second exemplary embodiment, the function of the display device 200 is different from that in the first exemplary embodiment. To be specific, the second exemplary embodiment is different from the first exemplary embodiment in that the color allocation table is not stored in advance. To be more specific, in the second exemplary embodiment, a step of determining the color allocation table is added before the processing of S102 in the flowchart of FIG. 5. Details will be described below.

Figure 10:
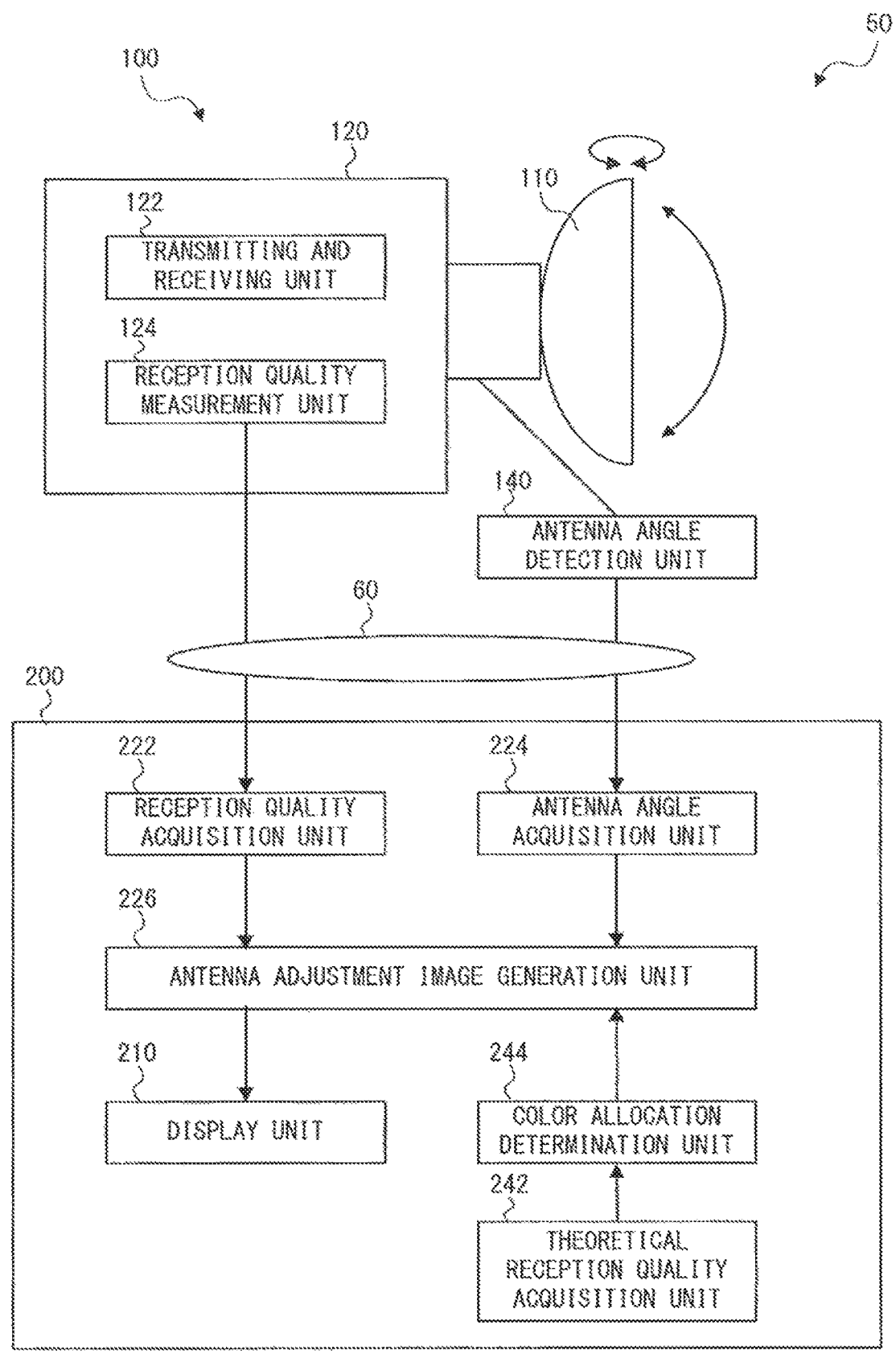
FIG. 10 is a functional block diagram of a communication system according to a second exemplary embodiment.

FIG. 10 is a functional block diagram of the communication system 50 according to the second exemplary embodiment. The function of the wireless communication device 100 is the same as that in the first exemplary embodiment. The display device 200 includes a reception quality acquisition unit 222, an antenna angle acquisition unit 224, an antenna adjustment image generation unit 226, a theoretical reception quality acquisition unit 242, a color allocation determination unit 244, and a display unit 210. The reception quality acquisition unit 222 and the antenna angle acquisition unit 224 are substantially the same as those in the first exemplary embodiment, and the description thereof is omitted.

The theoretical reception quality acquisition unit 242 acquires a theoretical value of the quality of a received signal (theoretical reception quality value) from a known value or the like. Note that, although a method that calculates the theoretical reception quality value when the quality of a received signal is received power (received signal level) is described by way of illustration in the following description, the theoretical reception quality value can be calculated in the same way when the quality of a received signal is another parameter (for example, SNR). Note that the theoretical reception quality acquisition unit 242 may acquire the theoretical reception quality value as a result that the theoretical reception quality value calculated by a user is input to the operation unit 208. On the other hand, the theoretical reception quality acquisition unit 242 may calculate it by arithmetic processing performed by the control unit 202 of the display device 200.

The theoretical reception quality value in the case where the quality of a received signal is received power, which is a theoretical value of received power, is Prx [dBm], the following equation 1 is satisfied.

$$Prx=Ptx-Lt+Gt-L+Gr-Lr[\text{dBm}] \quad \text{(Equation 1)}$$

Ptx [dBm] is the transmission power of a transmitter, which is the opposite station 102. Lt [dB] is a transmission supplying loss of the opposite station 102. Gt [dB] is a transmission antenna gain of the opposite station 102. L [dB] is a propagation loss from the opposite station 102 to the wireless communication device 100. Gr [dB] is a reception antenna gain of the wireless communication device 100. Lr [dB] is a reception supplying loss of the wireless communication device 100.

The propagation loss L is represented by the following equation 2.

$$L=10*\log(4\pi D/\lambda)^2 \text{ [dB]} \quad \text{(Equation 2)}$$

λ is the wavelength of a frequency used. D is a distance (link distance) between the transmission antenna of the opposite station 102 and the antenna 110 of the wireless communication device 100.

The color allocation determination unit 244 determines color allocation by using the theoretical reception quality value acquired by the theoretical reception quality acquisition unit 242. The theoretical reception quality value can be regarded as the maximum value which the reception quality value can take. Then, the color allocation determination unit 244 allocates the color indicating the highest quality to the range including the theoretical reception quality value. Stated differently, the color allocation determination unit 244 allocates the color indicating the highest quality to the range of the quality corresponding to the theoretical reception quality value. Further, the color allocation determination unit 244 allocates the color so that the color representation is more precise for the reception quality information indicating the quality close to the theoretical reception quality value than for the reception quality information indicating the quality far from the theoretical reception quality value.

FIG. 11 is a view showing an example of the color allocation table according to the second exemplary embodiment. Although the color indicating the highest quality is red in the color allocation table shown in FIG. 6, the color indicating the highest quality is bright red in the color allocation table shown in FIG. 11. The color allocation determination unit 244 determines the color allocation table, for example, illustrated in FIG. 11 by using the theoretical reception quality value. Further, in FIG. 11, Qmax indicates the maximum reception quality value, which is the theoretical reception quality value.

In the example of FIG. 11, the color allocation determination unit 244 determines the reception quality values Qi to Qn, which serve as the boundaries of color representation. Qmax>Qi>Qj>Qk>Ql>Qm>Qn is satisfied in this example. Then, the color allocation determination unit 244 allocates the color representation indicating the corresponding quality to the range between the boundary values. To be specific, the color allocation determination unit 244 allocates bright red color to the range where the reception quality value is equal to or more than Qi and equal to or less than Qmax. Further, the color allocation determination unit 244 allocates red color to the range where the reception quality value is equal to or more than Qj and less than Qi. The color allocation determination unit 244 allocates orange color to the range where the reception quality value is equal to or more than Qk and less than Qj. The color allocation determination unit 244 allocates yellow color to the range where the reception quality value is equal to or more than Ql and less than Qk. The color allocation determination unit 244 allocates yellow-green color to the range where the reception quality value is equal to or more than Qm and less than Ql. The color allocation determination unit 244 allocates green color to the range where the reception quality value is equal to or more than Qn and less than Qm. The color allocation determination unit 244 allocates blue color to the range where the reception quality value is less than Qn.

In the example of FIG. 11, the range of the reception quality value
to which each color is allocated is not necessarily fixed. To be specific, the width "Qmax−Qi" of the range to which "bright red color" is allocated may be the narrowest, and the width "Qi−Qj" of the range to which "red color" indicating the next highest quality is allocated may be the second narrowest. On the other hand, the width "Qn≤Qm" of the range to which "green color" indicating the relatively low quality may be wider than "Qmax−Qi" and "Qi−Qj". In this manner, in the antenna adjustment image, the reception quality information indicating the quality close to the theoretical reception quality value is plotted with more precise color representation compared with the reception quality information indicating the quality far from the theoretical reception quality value.

The antenna adjustment image generation unit 226 generates the antenna adjustment image by using the color allocation table determined by the color allocation determination unit 244. Note that the processing of generating the antenna adjustment image by the antenna adjustment image generation unit 226 is substantially the same as that in the first exemplary embodiment, and the description thereof is omitted.

Figure 12:
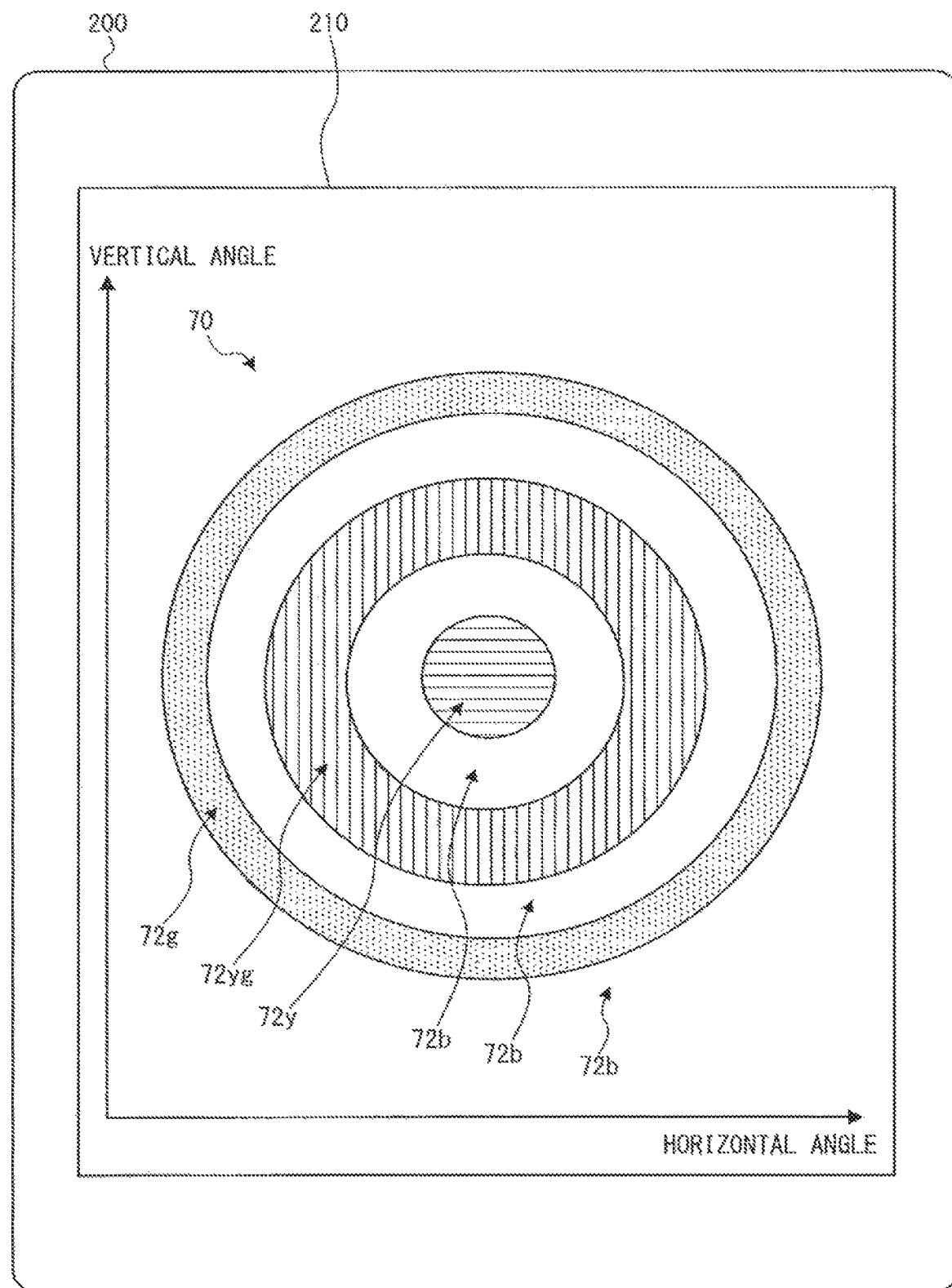
FIG. 12 is a view showing a first example of an antenna adjustment image displayed on a display device according to the second exemplary embodiment.

FIG. 12 is a view showing a first example of the antenna adjustment image that is displayed on the display device 200 according to the second exemplary embodiment. The first example shows the case where some abnormality is occurring in the reception from the opposite station 102. For example, it is the case where the opposite station 102 faces downward and therefore the wireless communication device 100 receives a reflected wave from the earth, not a direct wave, from the opposite station 102. Note that the reception quality value of a received signal due to abnormality is smaller than the reception quality value of a normal received signal.

In the example of FIG. 12, in the antenna adjustment image 70, the region 72y indicated by yellow color is located near the center. Further, in the antenna adjustment image 70, the region 72yg indicated by yellow-green color is located around the region 72y. In the antenna adjustment image 70, the region 72g indicated by green color is located around the region 72yg. In the antenna adjustment image 70, the region 72h indicated by blue color is located between the region 72y and the region 72yg, between the region 72yg and the region 72g, and around the region 72g.

In the antenna adjustment image 70 shown in FIG. 12, the region indicating the highest quality is the region 72y. The region 72y indicates the antenna angle corresponding to the reception quality information in the range where the reception quality value is equal to or more than Ql and less than Qk. The range of the reception quality information is significantly smaller than the theoretical reception quality value. Specifically, if communications with the opposite station 102 are normal, the region indicating the highest quality is supposed to indicate bright red color (or red color, or orange color) in the antenna adjustment image 70.

Therefore, a user can estimate that this antenna adjustment image 70 corresponds to an abnormal received signal such as a reflected wave from the earth. The user can thereby take measures such as checking the antenna direction of the opposite station 102 or checking whether there is no abnormality in the communication channel between the wireless communication device 100 and the opposite station 102.

Figure 13:
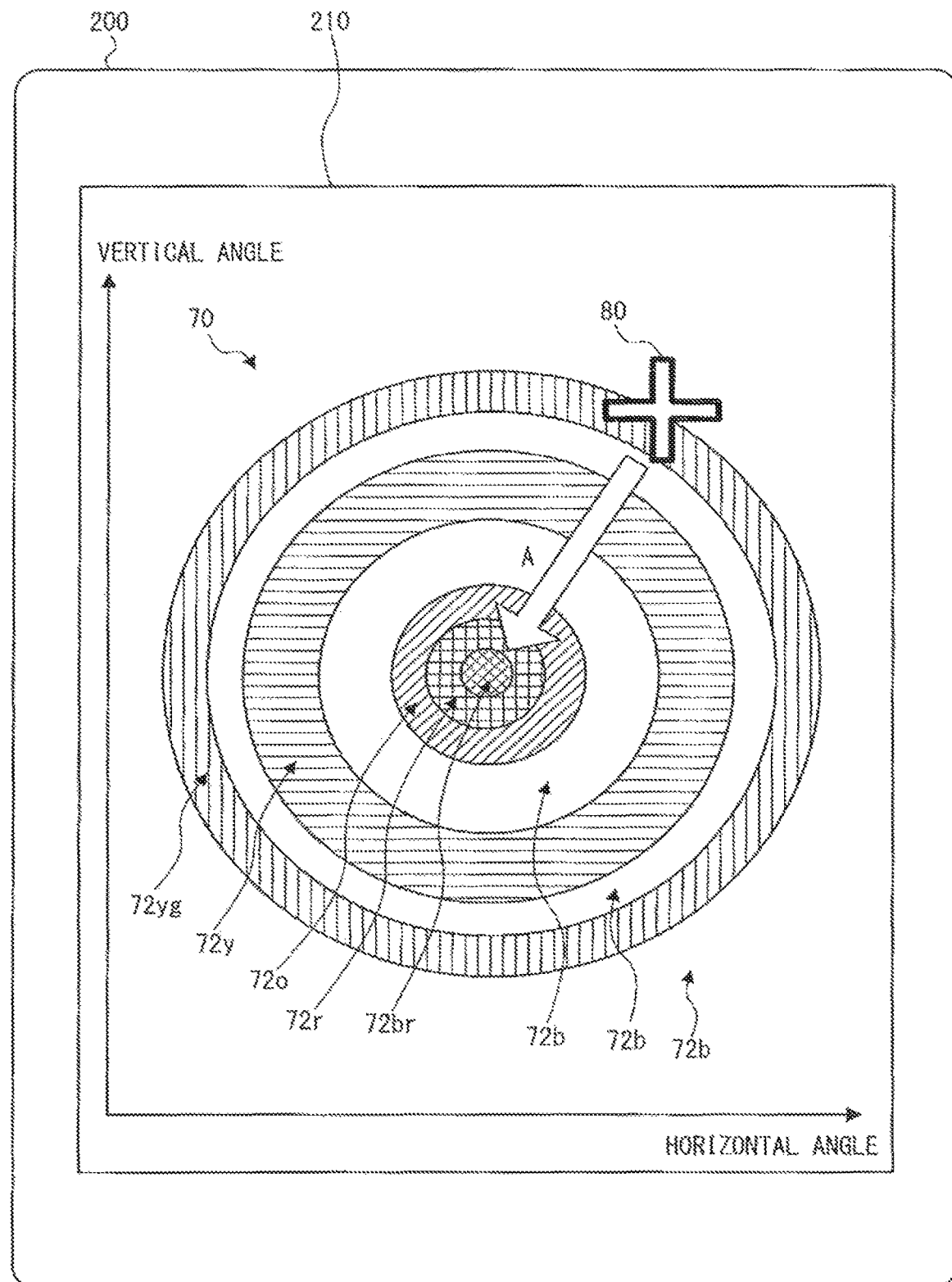
FIG. 13 is a view showing a second example of an antenna adjustment image displayed on the display device according to the second exemplary embodiment.

FIG. 13 is a view showing a second example of the antenna adjustment image that is displayed on the display device 200 according to the second exemplary embodiment. The second example shows the case where a radio wave is normally received from the opposite station 102. The antenna adjustment image 70 shown in FIG. 13 corresponds to the antenna adjustment image 70 shown in FIG. 7. Specifically, the antenna adjustment image 70 shown in FIG. 13 shows the correspondence between the antenna angle and the reception qua information in the antenna adjustment image 70 shown in FIG. 7 by the method according to the second exemplary embodiment.

In the example of FIG. 13, in the antenna adjustment image 70, the region 72br indicated by bright red color is located near the center. Further, in the antenna adjustment image 70, the region 72r indicated by red color is located around the region 72br. In the antenna adjustment image 70, the region 72o indicated by orange color is located around the region 72r. In the antenna adjustment image 70, the region 72y indicated by yellow color is located around the region 72o. In the antenna adjustment image 70, the region 72yg indicated by yellow-green color is located around the region 72y. In the antenna adjustment image 70, the region 72b indicated by blue color is located between the region 72*o* and the region 72*y*, between the region 72*y* and the region 72*yg*, and around the region 72*yg*.

In FIG. 13, the quality of a received signal is highest at the position corresponding to the region 72*br*, the quality of a received signal is second highest at the position corresponding to the region 72*r*, and the quality of a received signal is third highest at the position corresponding to the region 72*o*. The region 72*br*, the region 72*r* and the region 72*o* are continuous. Specifically, in FIG. 13, the antenna angles corresponding to the region 72*br*, the region 72*r* and the region 72*o* can correspond to the main lobe 92. The point at which the reception quality value is highest, which is the most appropriate direction, is estimated as the point near the center of the region 72*br*.

Then, in FIG. 13, the reception quality information related to the angle corresponding to the main lobe 92 is represented by precise color representation. To be specific, in FIG. 7, the reception quality information related to the angle corresponding to the main lobe 92 is represented only by one color, which is red. On the other hand, in FIG. 13, the reception quality information related to the angle corresponding to the main lobe 92 is represented precisely by three colors, which are bright red, red and orange. Stated differently, in the second exemplary embodiment, the accuracy of display in close proximity to the theoretical reception quality value (the maximum value of the reception quality value) is high. Further, the size of the region 72*br* in FIG. 13 is smaller than the size of the region 72*r* in FIG. 7. Therefore, compared with the case of using the antenna adjustment image 70 shown in FIG. 7, a user can easily set the current angle mark 80 in the most appropriate direction (which is the point near the center of the region 72*br*) as shown by the arrow A.

Further, in the first exemplary embodiment, when the setting of color allocation in the preset color allocation table is not appropriate, the level of the reception quality value is not appropriately represented in some cases in the antenna adjustment image. For example, when Qc in FIG. 6 is greater than the theoretical reception quality value, the antenna adjustment image is blue all over the image, and a user cannot find the angle corresponding to the main lobe 92. On the other hand, in the second exemplary embodiment, because the color indicating the highest reception quality value is allocated in accordance with the theoretical reception quality value, it is possible to determine the angle corresponding to the main lobe 92.

Alternative Example

It should be noted that the present invention is not limited to the above-described exemplary embodiments and may be varied in many ways within the scope of the present invention. For example, although the display device 200 acquires the reception quality information and the antenna angle information through the communication channel 60 in the above-described exemplary embodiments, the reception quality information and the antenna angle information may be acquired through physically different communication channels. Specifically, the reception quality information and the antenna angle information may be acquired through different ports in the display device 200.

Further, although the image representation indicating the reception quality information is the color representation such as red or orange color in the above-described exemplary embodiments, the present invention is not limited thereto. For example, the image representation may be a grayscale (black shading), a plurality of types of patterns or the like. Specifically, the image representation may be any representation where the reception quality information indicating the same quality is visually the same. Stated differently, the image representation is not limited as long as it represents the level of the quality of a received signal in a visually distinguishable manner.

Further, when the image representation is the color representation, each color representation may be represented by color in shades. It is thereby possible to represent the reception quality information more precisely in the antenna adjustment image. Further, in the color allocation table, the color value of R (Red), G (Green) and B (Blue) and the reception quality value may be made to correspond to each other without distributing the color discretely by dividing the range of the reception quality value. It is thereby possible to represent the reception quality information yet more precisely (finely) in the antenna adjustment image.

Further, when generating the antenna adjustment image, the color representation indicating the corresponding reception quality information is plotted at the position corresponding to the antenna angle each time the antenna angle is changed as shown in FIG. 5 in the above-described exemplary embodiments; however, the present invention is not limited thereto. The quality of a received signal may be measured for each antenna angle, and the antenna angle and the reception quality information may be stored in association with each other. Then, after the measurement is done for all angles, the color representation indicating the reception quality information may be plotted for all angles at substantially the same time, and thereby the antenna adjustment image may be generated.

Further, although the wireless communication device 100 and the display device 200 are shown as separate devices in FIG. 3, the wireless communication device 100 and the display device 200 may be physically integrated. In other words, the wireless communication device 100 and the display device 200 may be one device. In this case, the communication channel 60 may be eliminated. The "communication system 50" according to this exemplary embodiment includes such a device as well.

Further, the processing in the color allocation determination unit 244 is not necessarily implemented in the display device 200. The processing of determining the color allocation may be performed in a different device from the display device 200 by using the calculated theoretical reception quality value. Then, the display device 200 may acquire data of the determined color allocation table from the different device.

Further, although the antenna adjustment image generation unit 226 generates the antenna adjustment image (first image) and the current angle mark (second image) in the above-described exemplary embodiments, the present invention is not limited thereto. A first image generation means may generate the first image, and a second image generation means may generate the second image. Further, an image generation device that at least includes a first image generation means and a second image generation means may generate the first image and the second image. In this case, the flowchart of FIG. 5 also shows an image generation method for generating the first image and the second image. Further, the wireless communication device 100 (communication device) may include this image generation device, and the wireless communication device 100 (communication device) may output the reception quality information to this image generation device.

In the above example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, DVD-ROM (Digital Versatile Disc Read Only Memory). DVD-R (DVD Recordable)), DVD-R DL (DVD-R Dual Layer)), DVD-RW (DVD ReWritable)), DVD-RAM), DVD+R), DVR+R DL), DVD+RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

1 DISPLAY DEVICE
12 ANTENNA ANGLE ACQUISITION UNIT
14 RECEPTION QUALITY ACQUISITION UNIT
16 DISPLAY UNIT
20 ANTENNA
50 COMMUNICATION SYSTEM
70 ANTENNA ADJUSTMENT IMAGE
80 CURRENT ANGLE MARK
100 WIRELESS COMMUNICATION DEVICE
110 ANTENNA
120 COMMUNICATION INSTRUMENT
124 RECEPTION QUALITY MEASUREMENT UNIT
140 ANTENNA ANGLE DETECTION UNIT
200 DISPLAY DEVICE
210 DISPLAY UNIT
222 RECEPTION QUALITY ACQUISITION UNIT
224 ANTENNA ANGLE ACQUISITION UNIT
226 ANTENNA ADJUSTMENT IMAGE GENERATION UNIT
228 COLOR ALLOCATION TABLE STORAGE UNIT
242 THEORETICAL RECEPTION QUALITY ACQUISITION UNIT
244 COLOR ALLOCATION DETERMINATION UNIT

The invention claimed is:

1. A device comprising:
a memory that stores a set of instructions; and
a controller configured to execute the set of instructions that when executed:
acquire an antenna angle information indicating a horizontal angle and a vertical angle of a current antenna;
display a target image based on an angle of the antenna and a reception quality information corresponding to the angle of the antenna; and
display a current position based on the antenna angle information in a two-dimensional coordinate system,
wherein the target image is formed such that the reception quality information, corresponding to the angel of the antenna, is plotted in the two-dimensional coordinate system, the two-dimensional coordinate system configured so that a horizontal direction indicates the horizontal angel and a vertical direction indicates the vertical angel.

2. The device according to claim 1, wherein the target image is circular.

3. The device according to claim 1, wherein the angle of the antenna and the reception quality information corresponding to the angle of the antenna is information acquired before the antenna angle information has been acquired.

4. The device according to claim 1, wherein the two-dimensional coordinate system shows the antenna angle two-dimensionally.

5. The device according to claim 1, wherein the angle of the antenna on which the target image is based includes a horizontal angle and a vertical angle.

6. The device according to claim 5, wherein the two-dimensional coordinate system shows the horizontal angle and the vertical angle.

7. A method comprising:
acquiring an antenna angle information indicating a horizontal angle and a vertical angle of a current antenna;
displaying a target image based on an angle of the antenna and a reception quality information corresponding to the angle of the antenna; and
displaying a current position based on the antenna angle information in a two-dimensional coordinate system,
wherein the target image is formed such that the reception quality information, corresponding to the angel of the antenna, is plotted in the two-dimensional coordinate system, the two-dimensional coordinate system configured so that a horizontal direction indicates the horizontal angel and a vertical direction indicates the vertical angel.

8. A non-transitory computer readable medium storing a program for causing a computer to execute:
a step of acquiring an antenna angle information indicating a horizontal angle and a vertical angle of a current antenna;
a step of displaying a target image based on an angle of the antenna and a reception quality information corresponding to the angle of the antenna; and
a step of displaying a current position based on the antenna angle information in a two-dimensional coordinate system,
wherein the target image is formed such that the reception quality information, corresponding to the angel of the antenna, is plotted in the two-dimensional coordinate system, the two-dimensional coordinate system configured so that a horizontal direction indicates the horizontal angel and a vertical direction indicates the vertical angel.

* * * * *

UNITED STATES PATENT AND TRADEMARK OFFICE
CERTIFICATE OF CORRECTION

PATENT NO.       : 10,630,400 B2
APPLICATION NO.  : 16/456142
DATED            : April 21, 2020
INVENTOR(S)      : Tomohiro Kikuma It is certified that error appears in the above-identified patent and that said Letters Patent is hereby corrected as shown below:

In the Specification

Column 2, Summary of Invention, Line 5; Delete "in" and insert --In-- therefor

Column 4, Description of Embodiments, Line 67; After "unit", insert --12--

Column 5, Description of Embodiments, Line 1; After "means", insert --),--

Column 6, Description of Embodiments, Line 12; Delete "antenna." and insert --antenna-- therefor Column 10, Description of Embodiments, Line 5; Delete "angle)," and insert --angle).-- therefor Column 10, Description of Embodiments, Line 30; Delete "72h" and insert --72b-- therefor Column 10, Description of Embodiments, Line 33; Delete "72h" and insert --72b-- therefor Column 14, Description of Embodiments, Line 23; Delete "72h" and insert --72b-- therefor Column 14, Description of Embodiments, Line 53; Delete "qua" and insert --quality-- therefor Column 17, Description of Embodiments, Line 8; Delete "Memory)." and insert --Memory),-- therefor Signed and Sealed this
Fourteenth Day of July, 2020

Andrei Iancu
*Director of the United States Patent and Trademark Office*